(12) United States Patent
Ehlers et al.

(10) Patent No.: US 8,320,299 B2
(45) Date of Patent: Nov. 27, 2012

(54) BROADBAND SATELLITE SYSTEM AND METHOD

(75) Inventors: John Ehlers, Chandler, AZ (US); Steven Eymann, Phoenix, AZ (US); Phil Reum, Tempe, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 1121 days.

(21) Appl. No.: 12/202,505

(22) Filed: Sep. 2, 2008

(65) Prior Publication Data

US 2009/0059839 A1    Mar. 5, 2009

Related U.S. Application Data

(60) Provisional application No. 60/970,235, filed on Sep. 5, 2007.

(51) Int. Cl.
   *H04B 7/212* (2006.01)
(52) U.S. Cl. ........................................ 370/321
(58) Field of Classification Search ............ 370/321
   See application file for complete search history.

(56) References Cited

U.S. PATENT DOCUMENTS

| | | | |
|---|---|---|---|
| 5,812,545 A | 9/1998 | Liebowitz | |
| 6,081,709 A | 6/2000 | Karabinis | |
| 6,108,318 A | 8/2000 | Kolev et al. | |
| 6,628,707 B2 | 9/2003 | Rafie et al. | |
| 7,164,661 B2 | 1/2007 | Kelly | |
| 7,187,731 B2 | 3/2007 | Popper | |
| 7,461,130 B1 * | 12/2008 | AbdelAziz et al. | 709/208 |
| 8,015,154 B1 * | 9/2011 | Anderson | 707/638 |
| 2002/0118643 A1 | 8/2002 | Shalvi et al. | |
| 2002/0169846 A1 * | 11/2002 | Chen et al. | 709/209 |
| 2003/0056225 A1 * | 3/2003 | Bione | 725/116 |
| 2004/0105403 A1 | 6/2004 | Lin et al. | |
| 2005/0053033 A1 | 3/2005 | Kelly et al. | |
| 2005/0105524 A1 | 5/2005 | Stevens et al. | |
| 2005/0281271 A1 * | 12/2005 | Beshai et al. | 370/400 |
| 2006/0126576 A1 | 6/2006 | Dale et al. | |
| 2006/0244624 A1 * | 11/2006 | Wang et al. | 340/815.67 |
| 2006/0285514 A1 * | 12/2006 | Hoerl et al. | 370/328 |
| 2007/0186251 A1 * | 8/2007 | Horowitz et al. | 725/63 |

OTHER PUBLICATIONS

IEEE Publication: "COTS Implementation of Satellite-Based, Full-Mesh Multimedia Network".
IEEE Publication: "Satellite Full Mesh ATM LAN: Interconnection, Satellite Access Scheme, Signaling and Performance".

* cited by examiner

*Primary Examiner* — Sulaiman Nooristany
(74) *Attorney, Agent, or Firm* — Booth Udall, PLC (57) ABSTRACT

Implementations of broadband satellite systems may comprise systems implementing embodiments of one, two or all of the aspects of distributed leadership, distributed bandwidth allocation and distributed timing. In systems implementing distributed leadership aspects, the control and administration of the network can be effectively performed by any site. In systems implementing distributed bandwidth allocation aspects, all remote sites may act in concert by running the same algorithm on the information they have received, arriving at a harmonious conclusion. In systems implementing distributed timing aspects, time division multiple access ("TMDA") bursts within timeslots may not require a central timing reference, a distributed high stability timing reference or a timing leader.

15 Claims, 8 Drawing Sheets

| F1 | F2 | F3 | V | V | V | V | V | V | V | V | V | V | V | V |

FIG. 4

| F1 | F2 | F3 | C1 | C1 | C2 | C2 | C3 | C3 | S | S | S | S | S | S |

FIG. 5

| F1 | F2 | F3 | S | S | C1 | C2 | C3 | S | S | C1 | C2 | C3 | S | S |

FIG. 6

| F1 | C1 | C1 | F2 | C2 | C2 | F3 | C3 | C3 | S | S | S | S | S | S |

FIG. 7

| F1 | F2 | F3 | C1 | C1 | C2 | C2 | C3 | C3 | S1 | S1 | S2 | S2 | S3 | S3 |

FIG. 8

| F1 | F2 | F3 | C1 | C1 | C2 | C2 | C3 | C3 |    | S2 | S2 | S3 | S3 |

FIG. 9

| F1 | F2 | F3 | S2 | S2 | C2 | C2 | C3 | C3 | S2 | S3 | S2 | S2 | S2 | S3 |

BROADBAND SATELLITE SYSTEM AND METHOD

CROSS REFERENCE TO RELATED APPLICATIONS

This document claims the benefit of the filing date of U.S. Provisional Patent Application 60/970,235 to Ehlers, et al, entitled "Broadband Satellite System and Method," which was filed on Sep. 5, 2007, the disclosure of which is hereby incorporated herein by reference.

BACKGROUND

1. Technical Field

Aspects of this document relate generally to telecommunication systems, such as satellite, wired, and wireless systems.

2. Background Art

A growing number of satellite communication systems use time division multiple access ("TDMA") protocol for communications between earth stations or sites. In order to effectively control these networks, a single node, often referred to as a central site, hub or master terminal, is responsible for administering and policing the network. It is through this master terminal that new remote sites can be added, removed, or have their operating parameters, such as their bandwidth allocation, modified. This master station is also responsible for identifying remotes that have temporarily gone missing due to unforeseen circumstances, such as a power failure, and for successfully bringing them back into the network.

Because the leadership and control of the network rests solely upon the hub or master station, they present a single point of failure. Thus, a backup master station or redundant hub is often required to insure that the network will keep working if the prime unit suffers a failure. This additional equipment adds complexity and cost to the network, but is seen as a necessary evil.

Also with TDMA networks, a communication medium is shared amongst several users by dividing the medium into timeslots and then allocating those timeslots to the various users. For satellite communications, this medium typically consists of a single carrier frequency, or a set of multiple carrier frequencies. In traditional TDMA networks, the remote sites run in a "slave or dumb" operating mode, and thus do not have the ability to allocate bandwidth on their own. These sites rely on the hub or master station to coordinate their timeslot and/or frequency allocations. This reliance on a central controller adds latency to the network because a double satellite hop is required before bandwidth can be allocated.

The remote sites transmit their requests to the central site and then the central site transmits back the allocations to the remote sites. In some cases, such as an Aloha system, collisions are an unavoidable part of the system architecture which adds additional latency as the remote sites must transmit their bursts, wait to see if a collision has occurred, and if so, fallback and retransmit the burst.

In TMDA networks, users effectively share the communication medium by transmitting bursts of data at the prescribed times associated with their timeslots. Accurate timing is required in order to keep bursts from colliding or overlapping, which would cause a loss of data and necessitate retransmission. This is especially true of satellite network where the inherent movement of the satellite causes a shift in timing at every site in the network.

In traditional TDMA networks, accurate timing is typically achieved by either:
  a) "Slaving" the remotes sites to a central hub or master station where a high stability clock is installed or an external reference source is available; or
  b) Providing a high stability reference such as GPS at all of the sites. This can be cost prohibitive, especially in the case of large network.

With either traditional solution, the remotes will lock their internal clock to the provided reference (master station or local GPS), to prevent clock slippage relative to one another. Periodic updates are then sent out to adjust for the satellite movement. These adjustments are typically sent by the hub or one of the remotes that has been designated as the timing leader. Appropriate backup capabilities must be provided to insure that the network timing is preserved if the hub or timing leader is shut down.

SUMMARY

Implementations of broadband satellite systems configured according to an aspect of broadband satellite systems disclosed herein may provide a method of distributed leadership where by the control and administration of the network can be effectively performed by any site. The resulting network may be self-forming, self-healing, and may not require a designated master station or hub. In the resulting network, all of the remote sites may be configured to be fully capable of leading the network. In such networks, the failure of a particular site or sites would not adversely affect the other sites in the network or cause the entire network to crash.

Implementations of broadband satellite systems configured according to another aspect of broadband satellite systems disclosed herein may provide a distributed method for bandwidth allocation that does not rely on a central site or master station for timeslot or frequency allocation. Within this distributed architecture, all remote sites may act in concert by running the same algorithm on the information they have received, arriving at a harmonious conclusion. Because each remote site calculates the answer individually, it is not required to wait for the central site to respond to a request and bandwidth can be allocated after only a single satellite hop. In addition, improved collision avoidance methodology may provide for satellite network operation that is collision free, thus improving throughput by not requiring retransmission of data due to collisions.

Implementations of broadband satellite systems configured according to yet another aspect of broadband satellite systems disclosed herein may provide a distributed method for properly aligning TDMA bursts within the timeslots that does not require a) a master station or central timing reference; b) a distributed high stability timing reference; or c) a timing leader to send out periodic updates to account for movement of the satellite; and still accounts for any clock slippage amongst the sites regardless of the accuracy of the clocks at those sites.

Implementations of broadband satellite systems configured according to still yet another aspect of broadband satellite systems disclosed herein may provide a simplified method of calculating signal time delay when adding a new remote site to a network. In particular implementations only the angle of inclination, or the look angle, for the remote site is used to calculate distance, and thus delay, to the satellite. The hole in the burst plan made to accept the new remote site is kept to a minimum without requiring complicated calculations or highly accurate GPS positioning systems because the delay can be calculated accurately enough to size the burst plan hole from that angle.

BRIEF DESCRIPTION OF THE DRAWINGS

A variety of implementations will hereinafter be described in conjunction with the appended exemplary, non-limiting drawings, where like designations denote like elements, and.

DESCRIPTION

This disclosure, its aspects and implementations, are not limited to the specific components or assembly procedures disclosed herein. Many additional components and procedures known in the art consistent with the intended broadband satellite systems and their aspects will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such broadband satellite systems and implementing components and methods, consistent with the intended operation.

Distributed Leadership

Two aspects of distributed leadership in various implementations of a broadband satellite system relate to self-forming systems and self-healing systems. A self-forming system is one in which the satellite network does not need to be told who its members are, but will automatically identify the relevant members and form the network. A self-healing system is one in which the satellite network automatically identifies when a member is unaccounted for and actively seeks to restore connection with that member.

To establish a self-forming and self-healing satellite network with distributed leadership, the network may include: 1) a unique identifier associated with each node in the network; and 2) bandwidth allocation parameters associated with each node in the network, such as dedicated information rate, committed information rate, and maximum information rate. Those of ordinary skill in the art will appreciate that additional parameters may also be specified for each node in the network.

In a first particular implementation of a broadband satellite network configured to comprise distributed leadership aspects, every site includes some form of non-volatile memory such as compact flash or a USB drive. Any type or grade of non-volatile memory could be implemented depending upon the requirements and needs of a particular application. With non-volatile memory, every site in the satellite network is capable of storing the unique parameters associated with all of the sites nodes in the network. The operational parameters for transmission and reception of a signal carrier are entered at each site to establish criteria for that site to either establish a network or join an existing network. The method by which these operational parameters or established and entered is not crucial. Any method of configuration including, but not limited to, manual entry by an operator, automated entry via computer, or insertion of a pre-loaded memory card or device may be utilized. Those of ordinary skill in the art will appreciate that a receiver may be configured to scan the receive spectrum looking for a network to join.

When a network is established for the very first time, the unique parameters associated with all of the sites in the network are loaded into at least one of the sites in the network. The method by which the parameters are loaded is not crucial. Any method of loading, including but not limited to manual entry by an operator, automated entry via computer, or insertion of a pre-loaded memory card or device is sufficient.

Figure 1:
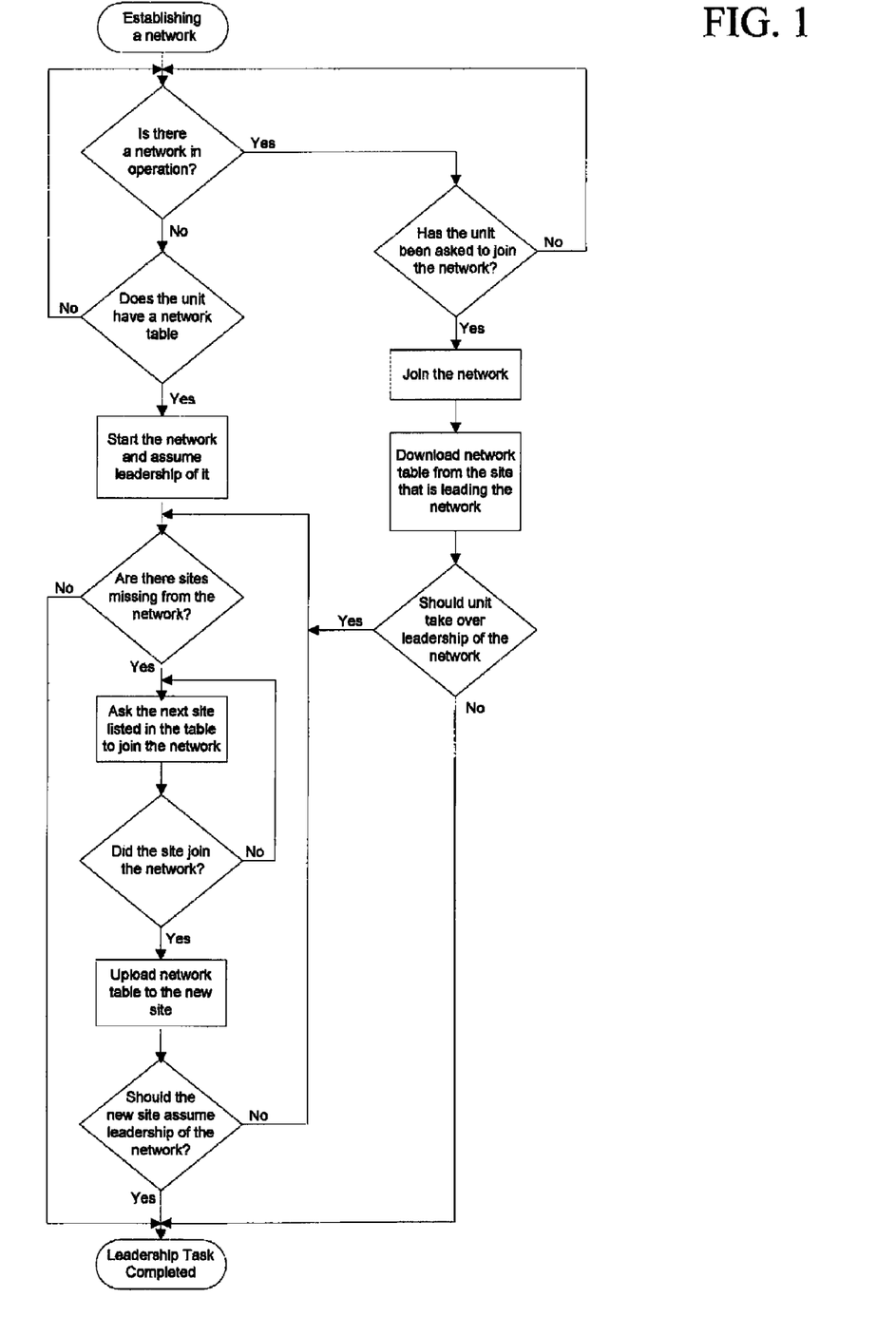
FIG. 1 is a flowchart describing a particular implementation of a distributed, self forming network.

FIG. 1 is flowchart outlining a particular, non-limiting example implementation of a process every site may perform whenever it is not actively participating in a network to allow the remote site to join an existing network if there is already one in progress, or to assume leadership and establish a new network if there is not. The following is a textual description of that process:

The site tunes its receiver and begins listening to determine whether or not there is a network already running on the prescribed frequency. If there is a network already running, the site waits until it is asked to join the network before enabling its transmitter. During the wait, the site may be configured to continually, or periodically verify that the network is still in place.

When the site is asked to join the network, the site enables its transmitter and responds to the invitation to join. The site then downloads the network table from the current network leader, which is the site that asked it to join. When the download is completed, the site uses the information contained in the table to determine if it should now assume leadership of the network. Although the criteria for assuming leadership and determining leadership hierarchy may vary in different particular implementations, according to a particular implementation the determination of whether to assume leadership is simply whether or not the remote site making the determination is the lowest numbered remote site that is currently actively participating in the network. Otherwise, the remote site will simply remain as an active network participant.

If there is not a network already running, or if the network stopped running before the remote site was asked to join, the remote site will determine whether or not it has a valid network table. If it does not, the remote site will continue to wait for a network to form so that it can join, or alternatively, wait for a valid network table to be loaded. If the site already has or subsequently obtains a valid network table, it will enable its transmitter and assume leadership of the network.

If there are sites listed in the network table that are not currently participating in the network, the current leader site will continue to ask them to join until such time as one or more of them accepts the invitation and joins.

When a new site joins the network, the current leader site will upload the network table into the new site. After successfully uploading the table, the current leader will determine whether or not it should remain as the network leader. If not, it will relinquish leadership of the network to the new site. If so, it will continue to bring in other missing sites until such time as all of the sites are in the network or a lower numbered remote site joins the network, it which case, the current leader will relinquish control to the new leader site.

When a site joins the network and it has a lower position in the network table than the current leader, the new site will assume leadership of the network. As the new network leader, it performs the same processes as the old leader, that of identifying missing remotes and bringing them into the network.

Figure 2:
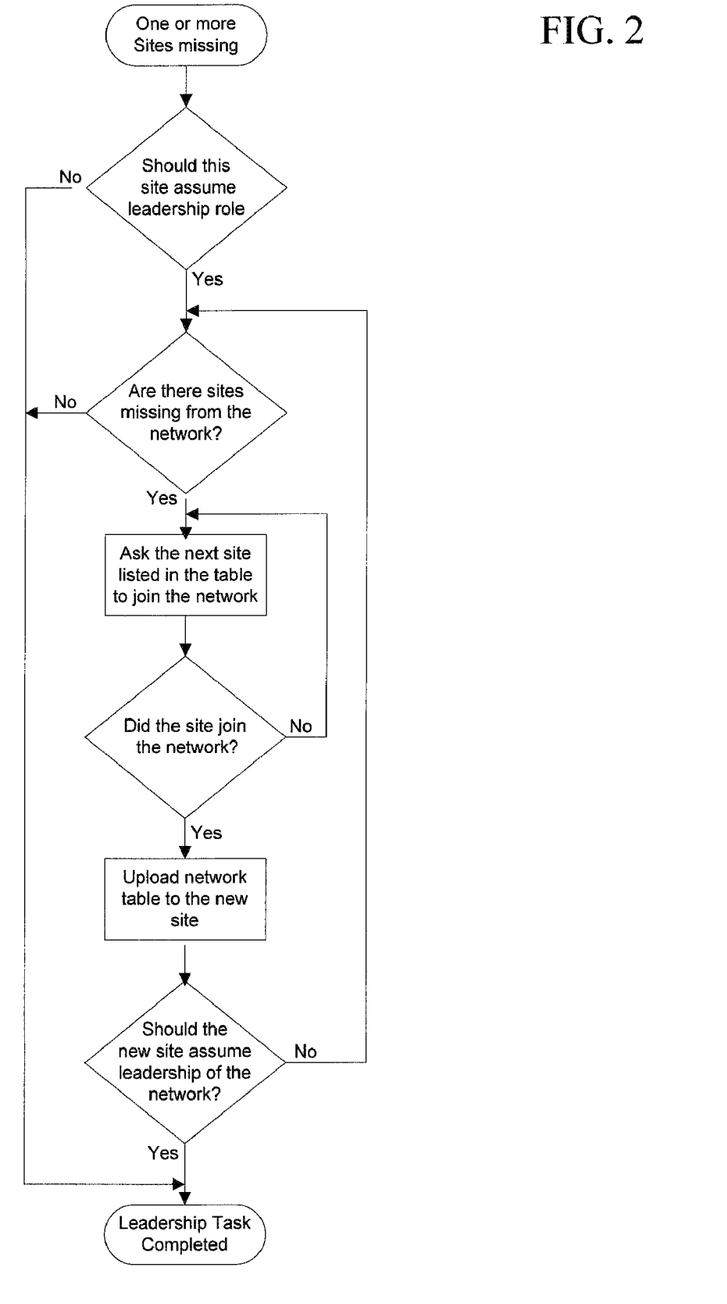
FIG. 2 is a flowchart describing a particular implementation of a distributed, self healing network.

FIG. 2 is flowchart outlining a particular, non-limiting example implementation of a process every participating site may perform whenever a remote site stops participating in network. This process provides the remaining remote sites with a method of establishing a leader for the purposes of bringing the missing remote sites back into the network.

In a particular implementation of a satellite network comprising distributed leadership aspects, the determination of which remaining remote site assumes leadership is simply whether or not a site is the lowest numbered remote that is currently participating in the network. If the site is the lowest numbered remote site, it assumes leadership of the network and begins looking for one or more missing remote sites. The process involved in identifying the missing remote sites, bringing them back into the network, and relinquishing leadership to them as required is similar to the functionality described previously with reference to FIG. 1. If the site is not the lowest numbered remote currently in the network, the remote site will still remain in the network as an active participant, but not as the leader. Those of ordinary skill in the art will appreciate that other methods of determining a leadership hierarchy could be utilized.

Distributed Bandwidth Allocation

Figure 3:
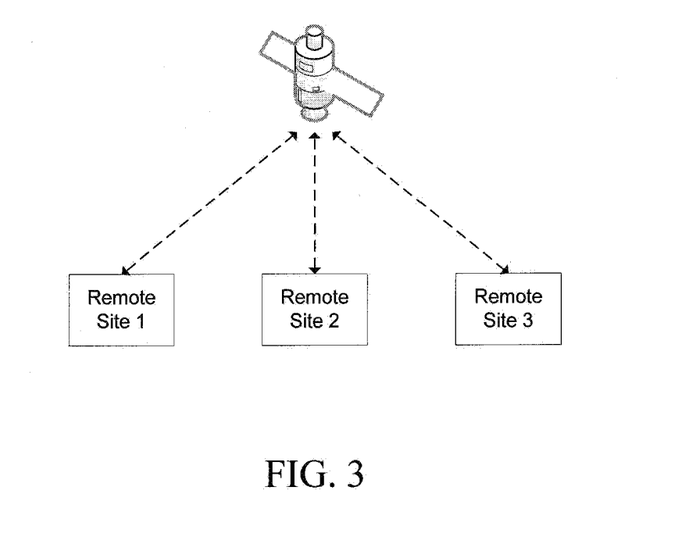
FIG. 3 illustrates a particular implementation of a TDMA satellite network.

FIG. 3 illustrates a TDMA network with three remote sites time sharing the same carrier frequency. The TMDA network may comprise more remote sites or even only two remote sites, but three remote sites are used in this non-limiting example for simplicity of description. In particular implementations of a TMDA network configured to include distributed bandwidth allocation aspects, each remote site comprises a modem having a modulator and a demodulator, a terrestrial interface for inputting of data to be transmitted over the satellite and outputting of data received via the satellite, and hardware for transmitting a signal to and receiving a signal from the satellite. Adding additional modulators and/or demodulators to each remote site allows for simultaneous transmission and/or reception of multiple carriers. Those of ordinary skill in the art will readily understand how to utilize this additional equipment to allow for multiple carriers.

Figure 4:
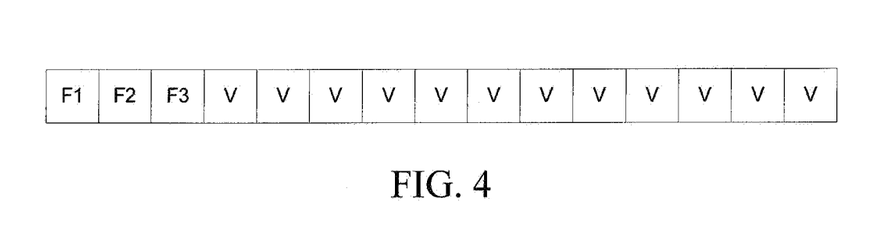
FIG. 4 illustrates a particular implementation of a frame structure.

FIG. 4 illustrates a frame structure in accordance with a particular, non-limiting implementation of a broadband satellite network using TMDA protocols. Within the frame of FIG. 4, there are fixed bursts (F) comprising a dedicated information rate that cannot be utilized by the other members of the network, and variable bursts (V) that can be allocated as needed to any and all members of the network. The size of each burst, the number of bursts per frame, and the number of frames per second are not critical to this aspect of a broadband satellite communication system. They could be of any size, number, and iteration that a designer deems sufficient to carry the desired traffic for a particular network or anticipated network.

Figure 5:
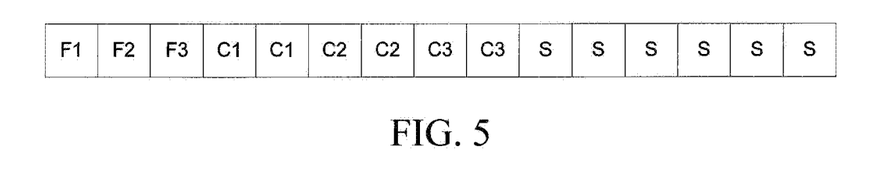
FIG. 5 illustrates a particular implementation of a more detailed frame structure.
Figure 6:
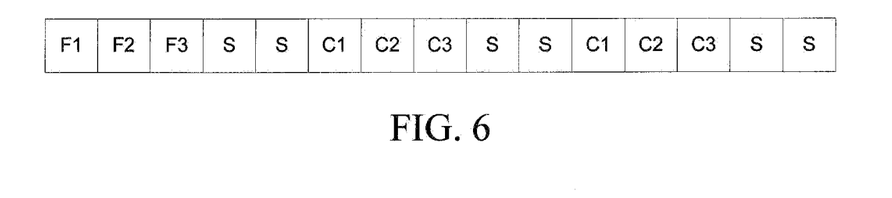
FIG. 6 illustrates a particular implementation of an alternative detailed frame structure.
Figure 7:
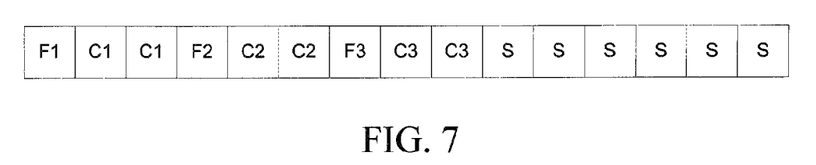
FIG. 7 illustrates a particular implementation of a second alternative detailed frame structure.

FIG. 5 illustrates frame structure similar to that used in FIG. 4, with some of the variable bursts now allocated as committed information rate (C), which is bandwidth that is guaranteed to be made available to a remote site when the particular remote site wants it, and which is still shareable by the other remote sites when the particular remote site does not. The remaining variable bursts and completely shareable (S) by any of the remote sites at any time based upon their needs. The ordering and position of the bursts within the frame is not critical. The bursts within the frame could be interleaved or feathered across the frame as illustrated by FIG. 6, or they could configured to originate from one remote site, then the next, and so on as illustrated by FIG. 7. For ease of understanding, FIG. 5 will be used as the base reference frame for purposes of this description without limitation. Those of ordinary skill in the art will readily understand how to construct additional partitions and/or additional formats for the frame depending upon the needs of a particular network or anticipated network application.

Thus, with reference to the particular non-limiting example illustrated by FIG. 5, once per frame, each remote generates a demand number based on an algorithm that looks at the incoming data for that remote site unit. This demand information is sent as part of the fixed burst (F) for that remote site. The actual algorithm used for generating the demand number is not critical.

One satellite hop later, all of the remote sites participating in the network receive the frame and embedded fixed bursts containing the demand information for all of the other remote sites participating in the network. Each remote site then calculates a burst plan based on the needs of all of the members of the network. Because each remote site is running the same bandwidth allocation algorithm, they will arrive at the same conclusion based on the same information. This calculated burst plan identifies the burst timeslots that each particular remote site will occupy in the next frame that is transmitted.

Figure 8:
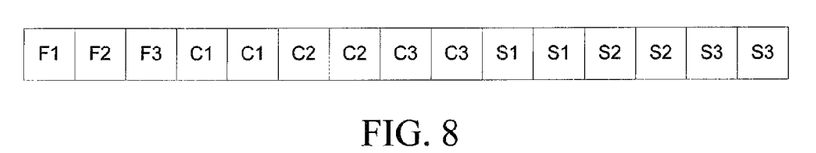
FIG. 8 illustrates an example of one instance of a frame that was dynamically allocated using a particular implementation of a distributed bandwidth allocation process.

With reference to the non-limiting example illustrated by FIG. 5 as the base frame, FIG. 8 illustrates another non-limiting example of a burst plan that would be calculated when all three remotes' demand numbers indicate that each would like as much bandwidth as possible. Each remote site will transmit its fixed burst (F), all of its committed bursts (C), and the appropriate portion of the shared bursts (S) based on the demands of all of the remote sites participating in the network.

Because errors are an inherent part of any satellite network, there will be instances where all of the remote sites may not hear all of the members' demand numbers for a particular frame. If this happens, a particular remote site may utilize a portion of the frame it already has until the next demand numbers are shared as follows: If a remote site does not hear all of the demand numbers for a particular frame, it may utilize only that portion of the frame reserved for fixed (F) and committed (C), and may not transmit bursts in the shared timeslots (S). It should be noted that the remote does not need to hear its own demand number that was transmitted for the frame, that number was known when it was transmitted and is available in the remote site's internal memory. Other algorithms by which a remote site may decide how much of a frame to use when it does not hear all of the demand numbers are contemplated and will be apparent to those of ordinary skill in the art from this description.

Figure 9:
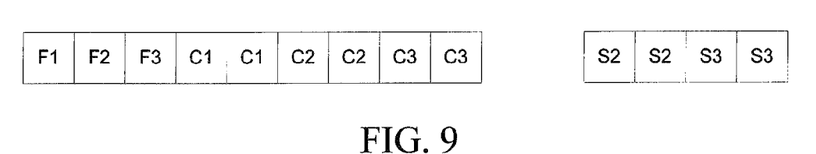
FIG. 9 illustrates an example of a second instance of a frame that was dynamically allocated using a particular implementation of a distributed bandwidth allocation process.

FIG. 9 illustrates a particular, non-limiting implementation of a burst plan that may be calculated when the demand numbers from all three remote sites indicate that each would like a much bandwidth as possible, but remote site 1 does not hear the demand number from one or more of the other remotes. In this situation, remote site 1 transmits its fixed burst (F), all of its committed bursts (C), but not any shared bursts (S). Remote sites 2 and 3 transmit their fixed bursts (F), all of their committed bursts (C), and the appropriate portion of the shared bursts (S) based on the demands of the remote sites participating in the network, leaving a gap in the shared bursts where they expected remote site 1 to burst based on its demand number.

Figure 10:
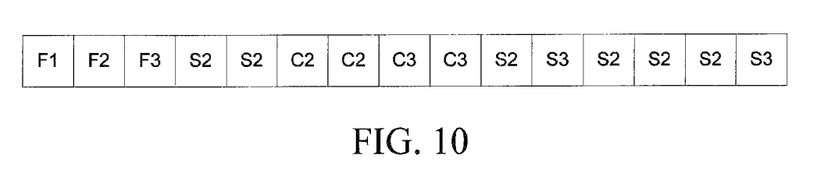
FIG. 10 illustrates an example of a third instance of a frame that was dynamically allocated using a particular implementation of a distributed bandwidth allocation process.

Many networks comprise data that is bursty in nature and therefore remote sites may need more or less bandwidth on a frame by frame basis. FIG. 10 illustrates a particular, non-limiting implementation of a burst plan that may be calculated if the demand numbers indicated that remote site 1 did not need its committed bursts and remote site 2 indicated it needed three times as much bandwidth as remote 3. In this case, remote site 1's committed bursts (C1) become part of the shareable pool (S) to be divided between remote sites 2 and 3.

Many varied burst plan calculation algorithms will become apparent from this disclosure and the burst plan calculation processes disclosed herein are only intended as non-limiting examples of the variety of burst plans that are possible to illustrate how a distributed bandwidth allocation aspect may be applied to a broadband satellite communication system.

Distributed Timing

Figure 11:
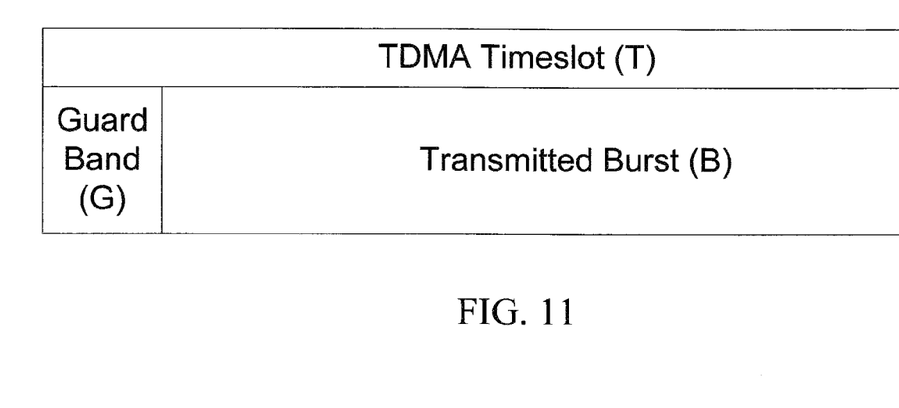
FIG. 11 illustrates a particular implementation of a TDMA timeslot.

FIG. 11 illustrates a TDMA timeslot (T). Within each timeslot, there is guard band (G) and the transmitted burst (B). The guard band provides a buffer into which the burst can drift prior to a periodic adjustment being made to keep the bursts aligned.

Figure 12:
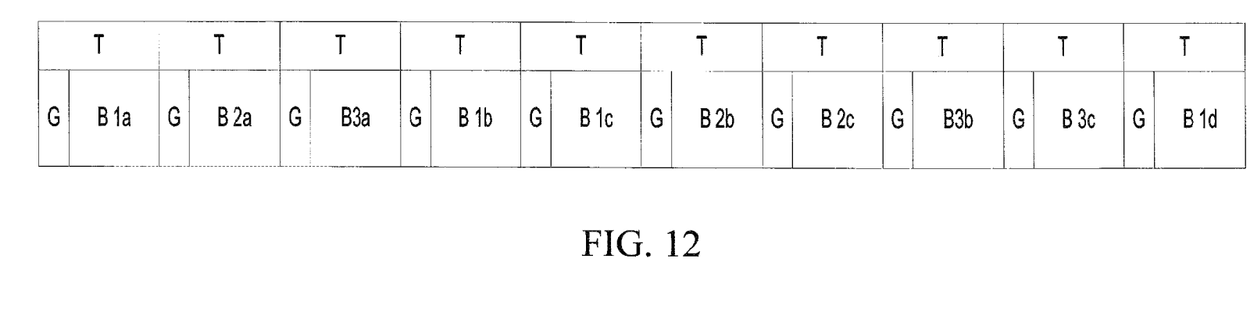
FIG. 12 illustrates an example of a typical series of TDMA timeslots.

FIG. 12 illustrates a particular non-limiting illustration of a TDMA carrier with three remote sites utilizing multiple timeslots (T), each comprised of a guard band (G) and a transmitted burst (B). Within this carrier, the guard band is used to provide a buffer between bursts to account for satellite movement and clock inaccuracies. Distributed timing aspects of this disclosed satellite communication system may readily be applied when two or more remote sites share a carrier.

Figure 13:
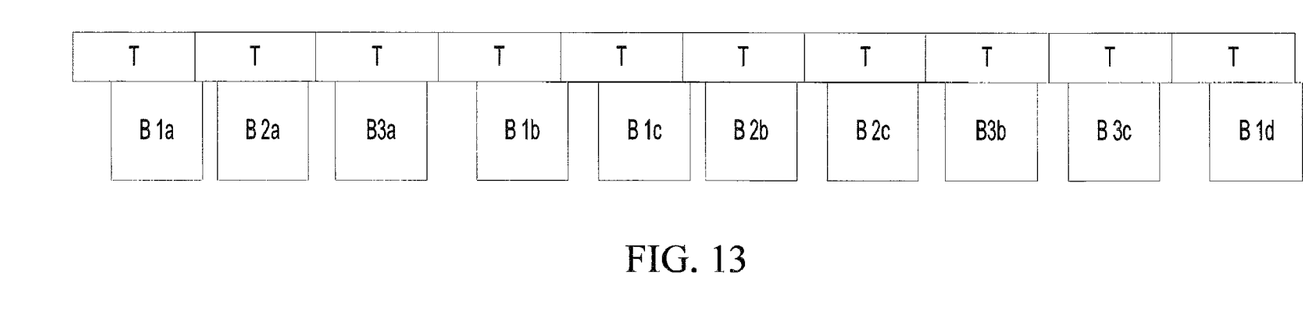
FIG. 13 illustrates an example of the typical movement of TDMA bursts within the series of TDMA timeslots due to clock inaccuracies and satellite movement.

FIG. 13 illustrates a conventional TDMA carrier in which bursts have drifted due to satellite movement and clock inaccuracies. A periodic update is required to readjust the position of the bursts and restore the TDMA carrier to the aligned carrier bursts illustrated in FIG. 12. Failure to adjust the position of the bursts within the carrier results in continued slippage and eventually the bursts will overlap causing a loss of data.

Figure 14:
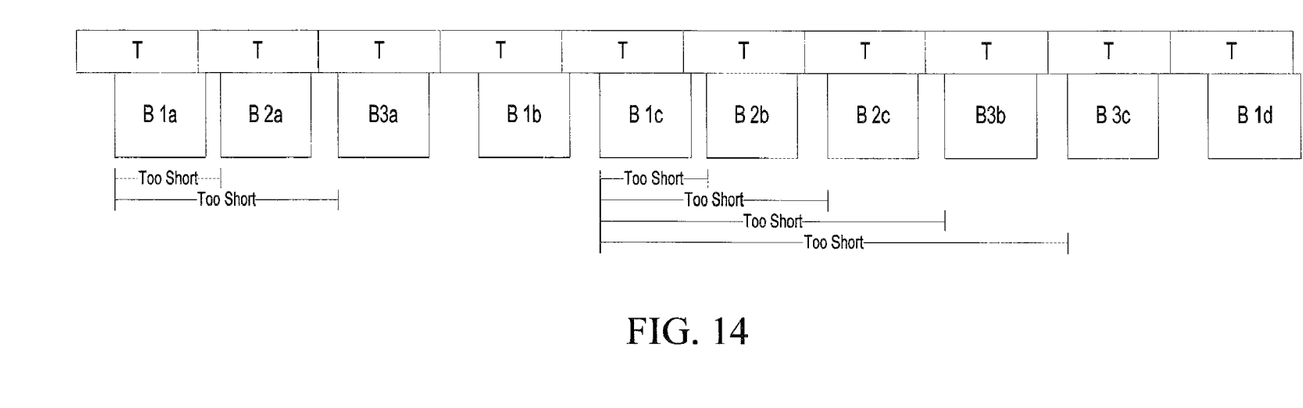
FIG. 14 illustrates an example of the measurements performed at one site in a particular implementation of a distributed timing network.
Figure 15:
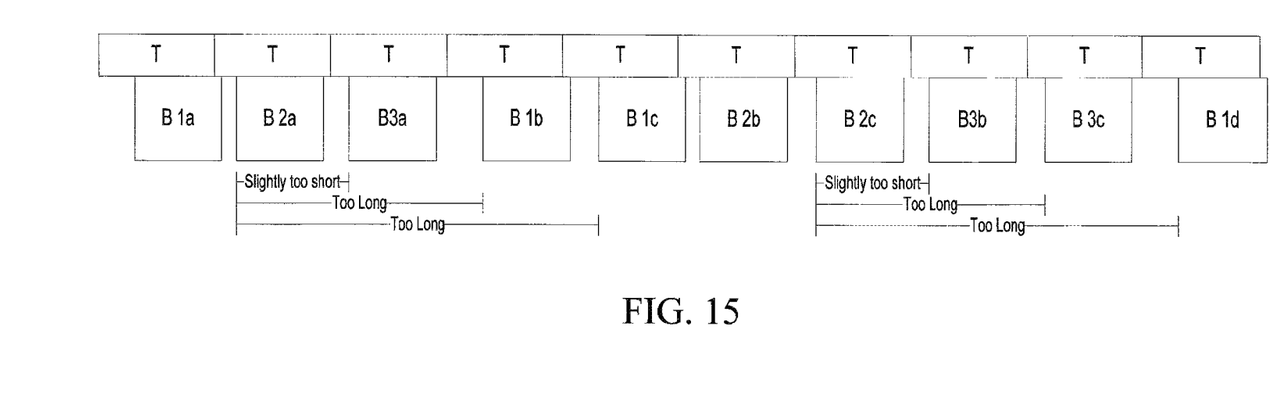
FIG. 15 illustrates an example of the measurements performed at a second site in a particular implementation of a distributed timing network.
Figure 16:
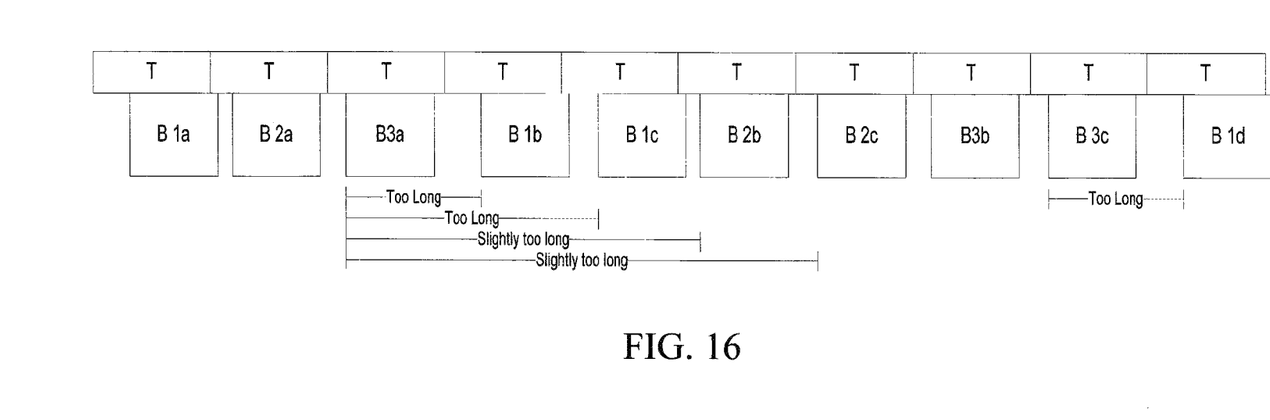
FIG. 16 illustrates an example of the measurements performed at a third site in a particular implementation of a distributed timing network.

FIGS. 14, 15 and 16 each illustrate particular non-limiting illustrations of measurements that may be performed by each remote site in accordance with a particular implementation of a broadband satellite communication system. Rather than relying on the timing of a central hub or timing leader, each remote site independently measures the time of arrival of its bursts relative to the bursts of all of the other remote sites participating in the network. To calculate its own adjustments to the timing for a particular implementation, the delta errors from the expected time of arrival are averaged over a short period of time and then applied as an appropriate step size and direction. Those of ordinary skill in the art will appreciate how this leaderless cooperative adjustment amongst the remote sites could also be applied to other areas where error correction is applicable, such as frequency adjustment.

As illustrated by FIG. 14, relative to the arrival time of its own bursts, remote site 1 is able to measure the delta arrival times of the other remote bursts and determine that they are all arriving too soon, because the expected times are "Too Short." By averaging the delta error over a period of time, and comparing the timing of remote site 1's own bursts with the timing of the bursts from the other remote sites, remote site 1 is able to determine an appropriate step size to move its burst forward to bring it more in line with the overall TDMA frame.

As illustrated by FIG. 15, relative to the arrival time of its own burst, remote site 2 is able to measure the delta arrival times of the other remote sites' bursts and, by comparing the delta arrival times with those of its own bursts, determine that while some are slightly too soon, others are too late and by a larger margin. By averaging the delta error over a period of time, and by comparing the timing of remote site 2's own bursts with the timing of the bursts from the other remote sites, remote site 2 is able to determine an appropriate step size to move its burst backwards to bring it more in line with the overall TDMA frame.

As illustrated by FIG. 16, relative to the arrival time of its own burst, remote site 3 is able to measure the delta arrival times of the other remote sites' bursts and, by comparing the delta arrival times with those of its own bursts, determine that they are all arriving too late. By averaging the delta error over a period of time, and comparing the timing of remote site 3's own bursts with the timing of the bursts from the other remote sites, remote site 3 is able to determine an appropriate step size to move its burst backwards to bring it more in line with the overall TDMA frame.

Figure 17:
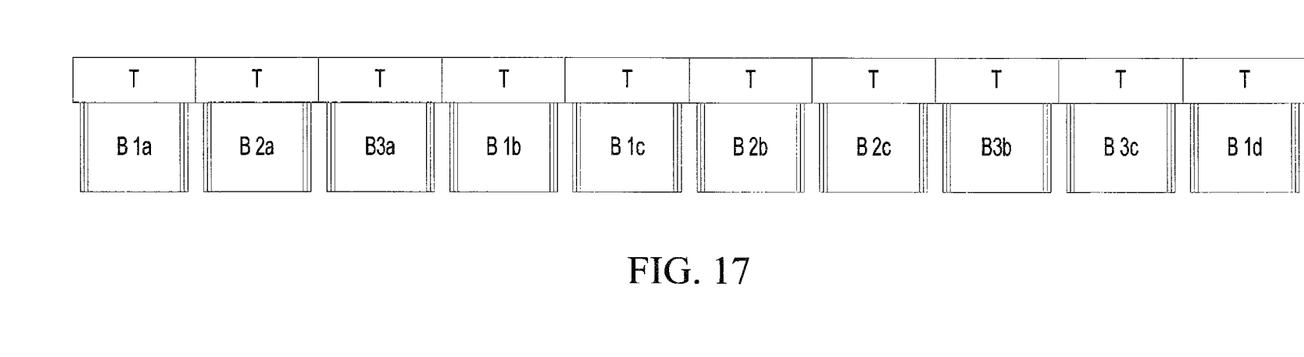
FIG. 17 illustrates an example of the resulting series of Timeslots within a particular implementation of a distributed timing network.

As illustrated by FIG. 17, the result of the averaging and adjusting performed by the individual remote sites is an acceptable dithering within the guard band. This dithering is robust enough to track normal clock offsets and satellite doppler for all satellites within a network, including those that don't have fine north-south station keeping.

Time Delay Calculation

In particular implementations of a broadband satellite network configured to comprise time delay calculation methods of the disclosure, when a satellite network accepts a new member to the network, adjustments are made in the burst plan to allow the remote site to range itself and communicate with the network. In many cases, the size of the added space in the burst plan ("the hole") to adapt for the newly added remote site is small. Calculation of the size of the hole may be small and can be calculated from the elevation angle of the satellite antenna.

Conventional satellite networks require a large hole size or very accurate GPS coordinates of both the site and the satellite to make its complicated calculation of the hole size needed. However, using simple geometrical math readily available on the Internet, the time delay to the satellite for the remote site may be calculated based solely on the antenna look angle. The antenna look angle may be calculated using either the approximate coordinates of the site and the orbital position of the satellite, or it may be measured with an inclinometer. This is possible because given the look angle, the distance of the particular remote site to the satellite is the same for all remote sites with that same inclination angle. Specific GPS coordinates are not needed to then allow the remote site to join any particular network. By calculating the time delay for new remote sites to join a network, the hole in the burst plan is kept fairly small, accurate timing and positioning data and calculations is not needed, and the disruptive effect to ongoing traffic on the existing network caused by the new remote site being added to the network is kept to a reasonable minimum.

In places where the description above refers to particular implementations of broadband satellite communication systems, distributed leadership aspects, distributed bandwidth allocation aspects or distributed timing aspects, it should be readily apparent that a number of modifications may be made without departing from the spirit thereof and that these implementations and aspects may be applied to other broadband satellite communication systems. The examples provided herein are intended to be non-limiting. The scope of the claims is intended to be defined solely by their terms when accorded a full range of equivalence with many variations and modifications naturally occurring to one of ordinary skill in the art from this disclosure without departing from the scope of the claims.

The invention claimed is:

1. A method of establishing distributed leadership for a satellite communication network, the method comprising:
   assigning a unique identifier to each of a plurality of remote sites in a communication network, each remote site configured for communication with at least one satellite;
   storing one or more bandwidth allocation parameters associated with each of the plurality of remote sites in memory at each of the plurality of remote sites, the one or more bandwidth allocation parameters comprising at least one of a dedicated information rate, a committed information rate, and a maximum information rate;
   wherein for each of the plurality of remote sites the method further comprising: automatically searching for a communication network to join when the remote site is not actively participating in any communication network;
   if the remote site finds a communication network to join, downloading a network table from a current network leader of the communication network identifying all of the remote sites of the plurality of remote sites expected to participate in the communication network and determining whether the remote site is to assume leadership of the communication network and assuming leadership if the unique identifier for the remote site is lower in a leadership hierarchy than the unique identifier for all other remote sites participating in the communication network; and
   automatically assuming leadership to form a new communication network if the remote site cannot find any communication network to join.

2. The method of claim 1, wherein for each of the plurality of remote sites the method further comprising: tuning a receiver associated with the remote site to a predefined frequency to determine whether any communication network exists to join when the remote site is not actively participating in any communication network.

3. The method of claim 2, wherein for each of the plurality of remote sites the method further comprising: waiting until the remote site is asked to join the existing communication network before enabling a transmitter associated with the remote site.

4. The method of claim 3, wherein for each of the plurality of remote sites the method further comprising responding to the invitation to join after the transmitter is enabled.

5. The method of claim 1, wherein for each of the plurality of remote sites, if the remote site assumes leadership of the new communication network, the method further comprising:
   identifying or loading a valid network table at the remote site;
   determining whether other remote sites of the plurality of remote sites are included in the valid network table that are not currently participating in the network; and
   submitting to the other remote sites not currently participating an invitation to join the new communication network.

6. The method of claim 5, wherein for each of the plurality of remote sites, if any of the other remote sites not currently participating joins the new communication network, the method further comprising: determining at the remote site whether to remain as the current network leader or relinquish leadership to one of the other remote sites of the plurality of remote sites.

7. A method of establishing distributed leadership for a satellite communication network, the method comprising:
   assigning a unique identifier to each of a plurality of remote sites in a communication network, each remote site configured for communication with at least one satellite;
   storing one or more bandwidth allocation parameters associated with each of the plurality of remote sites in memory at each of the plurality of remote sites, the one or more bandwidth allocation parameters comprising at least one of a dedicated information rate, a committed information rate, and a maximum information rate, and storing a network table by downloading from a current network leader of the communication network that identifies all of the remote sites expected to participate in the communication network;
   establishing a first remote site of the plurality of remote sites as the current network leader of the communication network, wherein each remote site is configured to assume leadership of the communication network when the leadership parameters indicate any of the remote sites is to become the current network leader;
   reestablishing which of the plurality of remote sites is the current leader when any remote site joins the communication network by each remote site of the plurality of remote sites assuming leadership and becoming the current network leader of the communication network if the unique identifier for the remote site is lower in a leadership hierarchy than the unique identifier for all other remote sites participating in the communication network; and
   wherein each remote site monitoring communication from each of the other remote sites expected to participate in the communication network to determine when any of the plurality of remote sites stops participating in the communication network.

8. The method of claim 7, wherein if one of the plurality of the other remote sites expected to participate in the communication network stops participating, the method further comprising: determining whether the current leader is the remote site that stopped participating and if so, re-establishing a new current leader selected from among the remaining remote sites of the plurality of remote sites.

9. The method of claim 8, further comprising the new current leader inviting the current leader that stopped participating in the network to rejoin the network.

10. The method of claim 7, wherein if one of the plurality of the other remote sites expected to participate in the communication network stops participating, the method further comprising the current leader inviting the remote site that stopped participating in the communication network to rejoin the network.

11. The method of claim 10, wherein when the remote site rejoins the communication network, the method further comprising: determining which remote site of the plurality of remote sites is to be the current leader pursuant to the leadership criteria and changing the current leader to the remote site that meets the leadership criteria.

12. A satellite communication network comprising:
   at least one communication satellite orbiting an Earth;
      a plurality of remote sites on the Earth as part of a communication network,
   wherein each of the remote sites comprises:
      a unique identifier associated with the remote site;
      memory configured to store one or more bandwidth allocation parameters associated with the remote site and a network table that identifies all other remote sites expected to participate in the communication network, the one or more bandwidth allocation parameters comprising at least one of a dedicated information rate, a committed information rate, and a maximum information rate;
      operational parameters stored at the remote site including parameters by which the remote site is configured to automatically search for the communication network to join when the remote site is not actively participating in any communication network, join an existing communication network, download the network table from a current network leader of the communication network, configure each remote site to assume leadership of the existing communication network if the unique identifier for the remote site is lower in a leadership hierarchy than the unique identifier for all other remote sites participating in the existing communication network when the remote site joins the existing communication network; and
      if the remote site cannot find any communication network to join, the remote site automatically assume leadership to form a new communication network by which the remote site is configured to establish the new communication network as the current network leader.

13. The satellite communication network of claim 12, wherein the bandwidth allocation parameters comprise at least one of a dedicated information rate, a committed information rate and a maximum information rate.

14. The satellite communication network of claim 12, wherein the operational parameters stored at the remote site further configure each remote site to monitor communication from each of the other remote sites of the plurality of remote sites to determine when any of the plurality of remote sites stops participating in the communication network.

15. The method of claim 14, wherein the operational parameters stored at the remote site further configure each remote site to determine whether the current leader is the remote site that stopped participating and if so, re-establish a new current leader selected from among the remaining remote sites of the plurality of remote sites.

* * * * *